(12) United States Patent
Dantwala

(10) Patent No.: US 6,933,953 B2
(45) Date of Patent: Aug. 23, 2005

(54) COST FUNCTION TO MEASURE OBJECTIVE QUALITY FOR SHARPNESS ENHANCEMENT FUNCTIONS

(75) Inventor: Nehal Dantwala, Peekskill, NY (US)

(73) Assignee: Koninklijke Philips Electronics N.V., Eindhoven (NL)

( * ) Notice: Subject to any disclaimer, the term of this patent is extended or adjusted under 35 U.S.C. 154(b) by 163 days.

(21) Appl. No.: 10/127,480

(22) Filed: Apr. 22, 2002

(65) Prior Publication Data

US 2003/0197712 A1 Oct. 23, 2003

(51) Int. Cl.[7] .............................................. G09G 5/00
(52) U.S. Cl. .............................................................. 345/617
(58) Field of Search .................................. 345/611, 617, 345/FOR 155–158; 348/208.13, 252, 399.1, 437.8, 438.1, 606, 607, 625, 627, 678, FOR 115, 437.1, 201; 382/215, 263, 264, 266

(56) References Cited

U.S. PATENT DOCUMENTS

| | | | | |
|---|---|---|---|---|
| 5,365,597 A | * | 11/1994 | Holeva | 382/318 |
| 2002/0122603 A1 | * | 9/2002 | Boroczky et al. | 382/263 |
| 2003/0123747 A1 | * | 7/2003 | Yang et al. | 382/254 |

* cited by examiner

Primary Examiner—Matthew C. Bella
Assistant Examiner—G. F. Cunningham
(74) Attorney, Agent, or Firm—Edward W. Goodman

(57) ABSTRACT

A system and method for selecting an enhancement vector for a plurality of enhancement functions using a cost function. A sharpness enhancement system is described that receives an input picture and outputs an enhanced picture, the sharpness enhancement system comprising: a plurality of enhancement functions that enhance the input picture; and a picture quality analyzer that selects an enhancement vector for the plurality of enhancement functions, wherein the enhancement vector is selected from a set of vectors based on a cost function that comprises: (1) a gradient analysis, and (2) a dynamic range analysis.

33 Claims, 3 Drawing Sheets

COST FUNCTION TO MEASURE OBJECTIVE QUALITY FOR SHARPNESS ENHANCEMENT FUNCTIONS

BACKGROUND OF THE INVENTION

1. Technical Field

The present invention relates generally to sharpness enhancement of video images, and more specifically relates to a system and method of calculating a cost function to identify an optimal level of enhancement.

2. Related Art

Many video enhancement techniques exist which modify picture content in such a way that the resulting picture is improved. Improvements may be due to the attenuation of certain artifacts in the picture, due to the accentuation of certain information in the picture, or even due to the addition of new video data. One example of video enhancement is the noise reduction function, in which unwanted data is filtered out of the picture to improve the end picture quality. Another example of video enhancement is sharpness improvement, where existing high frequencies are selectively enhanced or new high frequencies are added to the picture to improve the perceived sharpness.

However, since it is not unusual for the same picture data to pass through a cascade of video enhancement algorithms, it is far from trivial to guarantee optimal picture quality. As a simplified example, consider the cascading of noise reduction and sharpness enhancement algorithms. The noise reduction algorithm might reduce the high frequencies in the picture that seem random—considering them as noise, whereas the sharpness enhancement function might boost those frequencies—considering them as texture. Although one might expect the noise reduction algorithm to do a good job on noise reduction, it is not necessarily producing a noise-free picture. And as such, the sharpness enhancement algorithm needs to take the 'left-over' noise into account. In short, the functions used to enhance pictures are complex in nature, operate on the same picture data, and are interdependent. Thus, great care needs to be taken while designing and concatenating various video enhancement functions.

Similar issued are faced when designing just the sharpness enhancement system, since it is often desirous to implement more than sharpness enhancement function. Namely, in systems that utilize a plurality of sharpness enhancement functions, the interdependence of the functions may result in the same types of problems described above.

Sharpness enhancement functions may, for example, modify the gradient of the edges to create sharpness enhancement, often referred to as 'Luminance Transient Improvement' (LTI). Adding overshoots and undershoots near the gradients is another way of improving the sharpness impression (i.e., the "Mach Band" effect). This is done by selectively boosting mid-band and/or high-band frequencies in the picture, and is referred to as "peaking."

FIG. 1 depicts an implementation of a sharpness enhancement system 10 that enhances an original picture 12 using a pair of algorithms or enhancement functions 16 (e.g., peaking and LTI). The enhanced picture output 14 is defined by:

$$F_{enh}(\vec{x},n) = F(\vec{x},n) + \alpha^* F_{enh1}(\vec{x},n) + \beta^* F_{enh2}(\vec{x},n) \quad (1)$$

where $F(\vec{x},n)$ is the input video signal, $$\vec{x} = \begin{pmatrix} x \\ y \end{pmatrix}$$

is the position, n the picture number, $F_{enh1}$ is the output of enhancement 1, e.g., peaking and $F_{enh2}$ is the output of enhancement 2, e.g., LTI. The coefficients α and β are defined as the "enhancement vector."

In conventional methods, based upon the characteristics of the input signal $F(\vec{x},n)$, the coefficients α and β are selected independently while designing each of the enhancement functions 16. The parameters are often experimentally optimized to arrive at a reasonable setting in the combined scheme shown in FIG. 1. This is a critical task and can be quite tedious if the system gets larger. Also, since coefficients α and β are assumed to be independent, the interdependency is not seen in the function explicitly, which can cause artifacts if thorough testing is not performed.

Another drawback of this system is that it is not easy to expand or modify the set of functions 16 since the task of 'manual' optimization needs to be repeated. Also, spatial and temporal consistency in the functions 16 is not accounted for. Even if during the design of the individual algorithms, care is taken for consistency, the combination of algorithms could change this.

Accordingly, a need exists for a system and method of performing video enhancement that is completely expandable, takes into account the interdependencies of various functions, and guarantees spatial and temporal consistency.

SUMMARY OF THE INVENTION

The present invention addresses the above-mentioned problems, as well as others, by providing a system and method of calculating a cost function that gives an indication of sharpness quality. The cost function may be used to assist in the selection of an enhancement vector from a set of vectors in a system have a plurality of enhancement functions.

In a first aspect, the invention provides a sharpness enhancement system that receives an input picture and outputs an enhanced picture, the sharpness enhancement system comprising: a plurality of enhancement functions that enhance the input picture; and a picture quality analyzer that selects an enhancement vector for the plurality of enhancement functions, wherein the enhancement vector is selected from a set of vectors based on a cost function that comprises: (1) a gradient analysis, and (2) a dynamic range analysis.

In a second aspect, the invention provides a program product stored on a recordable medium that receives an input picture and outputs an enhanced picture, the program product comprising: a plurality of enhancement functions that enhance the input picture; and means for selecting an enhancement vector for the plurality of enhancement functions, wherein the enhancement vector is selected from a set of vectors based on a cost function that computes: (1) a gradient analysis, and (2) a dynamic range analysis.

In a third aspect, the invention provides a method of enhancing sharpness of an input picture to generate an enhanced picture, the method comprising: providing a plurality of enhancement functions that enhance the input picture; selecting an enhancement vector for the plurality of enhancement functions, wherein the enhancement vector is selected from a set of vectors based on a calculated cost function, wherein the cost function is calculated using: (1) a gradient analysis, and (2) a dynamic range analysis.

BRIEF DESCRIPTION OF THE DRAWINGS

These and other features of this invention will be more readily understood from the following detailed description of the various aspects of the invention taken in conjunction with the accompanying drawings in which.

DETAILED DESCRIPTION OF THE INVENTION

1. Overview

Described herein is a system and method for improving performance for a set of enhancement functions in a sharpness enhancement system. To achieve this, output quality is objectively measured and the gains associated with the individual enhancement functions are then modified such that the best quality is achieved. By analyzing the system output as opposed to the output of the individual functions, the problem of interdependencies is eliminated.

Figure 1:
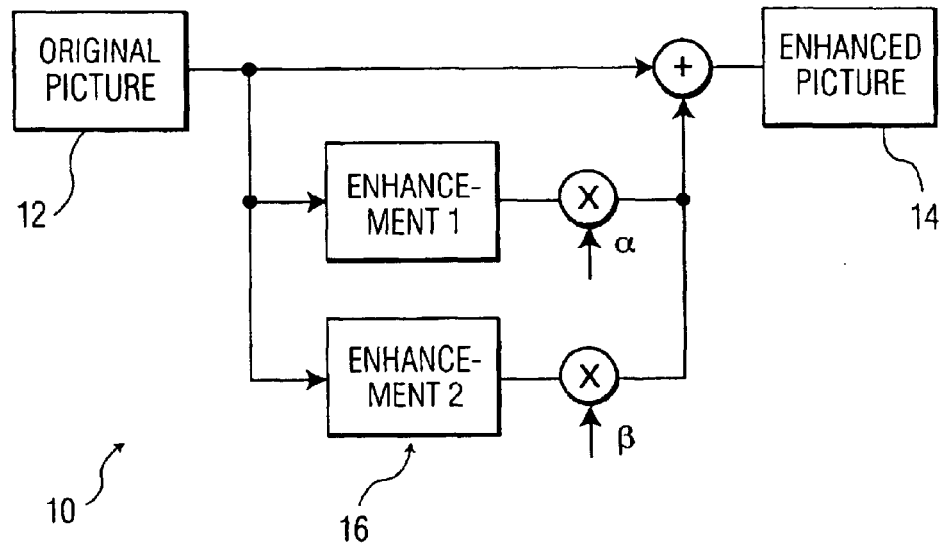
FIG. 1 depicts an enhancement system.
Figure 2:
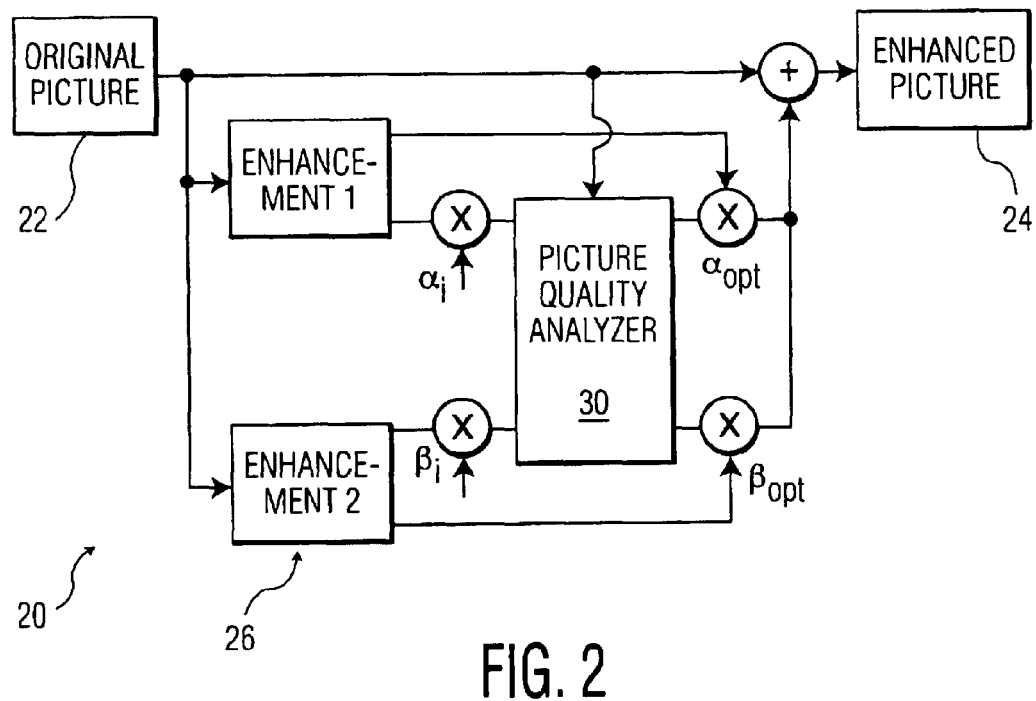
FIG. 2 depicts an enhancement system in accordance with the present invention.

FIG. 2 shows an exemplary diagram of a system 20 utilizing the proposed technique. In FIG. 2 an additional block is included, i.e., the picture quality analyzer 30, and instead of having just coefficients $\alpha$ and $\beta$, a set of candidate vectors ($\alpha_i$, $\beta_i$) are included. As described below, present invention provides a system in which the coefficients $\alpha$ and $\beta$, which make up the enhancement vector, are not independently selected. Rather, the picture quality analyzer 30 selects the optimal enhancement vector ($\alpha_{opt}$, $\beta_{opt}$) from the candidate set of vectors ($\alpha_i$, $\beta_i$) based upon the output quality generated by each vector in the set. To achieve this, a cost function is utilized to determine which vector from the set of enhancement vectors should be used. Implementation of the cost function is described in detail below.

Once the enhancement vector ($\alpha_{opt}$, $\beta_{opt}$) is selected by the picture quality analyzer 30, the enhancement vector is applied with the enhancement functions to the current block. The picture quality analyzer selects an enhancement vector for each block in the picture.

The output for system 30 of FIG. 2 is given as:

$$F_{enh}(\vec{x},n) = F(\vec{x},n) + \alpha_{opt} * F_{enh1}(\vec{x},n) + \beta_{opt} * F_{enh2}(\vec{x},n), \quad (2)$$

Where the coefficients that make up the enhancement vector ($\alpha_{opt}, \beta_{opt}$) are selected from a set of vectors ($\alpha_i$, $\beta_i$) where i=1,2, ... number of candidates. It should be recognized that the described system is not limited to two enhancement functions 26. If there are more functions that contribute to the sharpness of the picture, the enhancement vector can be expanded ($\alpha, \beta, \gamma \ldots$).

2. Picture Quality Analyzer

Figure 3:
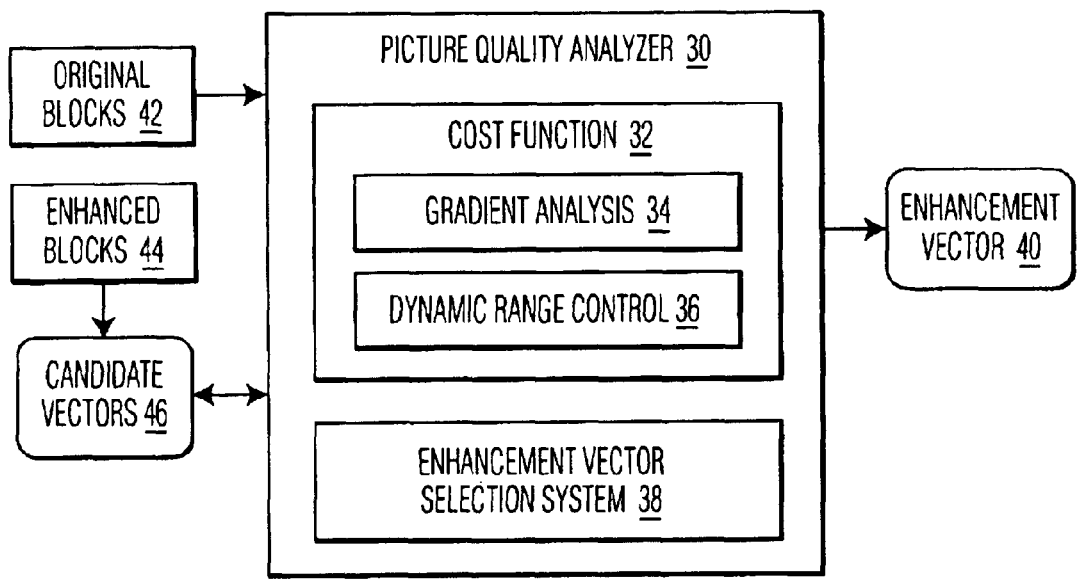
FIG. 3 depicts picture quality analyzer in accordance with the present invention.

Referring now to FIG. 3, an exemplary picture quality analyzer 30 is shown. Picture quality analyzer 30 includes an enhancement vector selection system 38 that selects enhancement vector 40 from a set of candidate vectors 46. Selection of the enhancement vector is achieved using a cost function 32 that includes a gradient analysis 34 and a dynamic range control 36.

The estimate of the best or optimal enhancement vector from the candidate set is defined as the one yielding the smallest cost, i.e., $$\text{Best Vector} = (\alpha_{opt}, \beta_{opt}) = \{(\alpha_i, \beta_i) | e(\alpha_i, \beta_i) < e(\alpha_j, \beta_j) \forall j, j \neq i\} \quad (3)$$

where i=1,2, ... number of candidates and e( ) is the cost function with vectors $\alpha_i$, $\beta_i$ as parameters.

The cost function 32 should incorporate all the factors that define good quality and also provide an artifact prevention mechanism. For example, in case of the sharpness enhancement function, the steepness of the gradients is an important factor and should be accounted for in the cost function. Artifacts like aliasing that may result from sharpness improvement should be prevented. Therefore, a protection mechanism should also be included in the cost function 32. The cost function 32 defines the relative amount of picture quality improvement.

Note that $\alpha_i * F_{enh1}(\vec{x},n) + 62_i * F_{enh2}(\vec{x},n)$ is used in the cost function 32 to measure the relative quality. This is different from conventional methods where $\alpha$ and $\beta$ are treated separately. Thus, the interdependencies in the enhancement functions 26 are addressed.

To improve consistency and reduce the computational effort, the enhancement vector 40 is determined on a block-by-block basis with a typical block size of 8×8 pixels on a standard definition "SD" grid. Thus, each 8×8-size block has an enhancement vector 40 ($\alpha$, $\beta$) associated with it as compared to each pixel in conventional methods. Note that an enhancement vector ($\alpha$, $\beta$) at block location $\vec{b} = (b_x \; b_y)^T$ can be written as $E(\vec{b}, n)$ where $b_x$, is the block number in x-direction and $b_y$ is the block number in y-direction for frame n. But for simplicity ($\alpha$, $\beta$) is used

3. Cost Function Details

In accordance with this exemplary embodiment, a cost is calculated for each candidate vector for each block in the picture. The vector having the lowest cost, as determined by the cost function, is then utilized. The proposed cost function has two parts to it: (1) Gradient Evaluation, and (2) Dynamic Range Control.

A. Gradient Evaluation:

One method of improving sharpness is to make the edge gradient steeper in the enhanced picture 24 than in the original picture 22. To achieve this, the edge positions, including the edge center, in the picture must first be located. An edge center is first found for every edge in each block of the original picture 22. An edge detector may be utilized on each block to find an edge map and corresponding edge centers. Note that there may be blocks that contain no edges. In this case, the block could be skipped. Once the edge center is located, the gradient of "n" pixel pairs surrounding the edge center is subtracted from the cost function 32. An example of this is depicted in FIG. 4.

Figure 4:
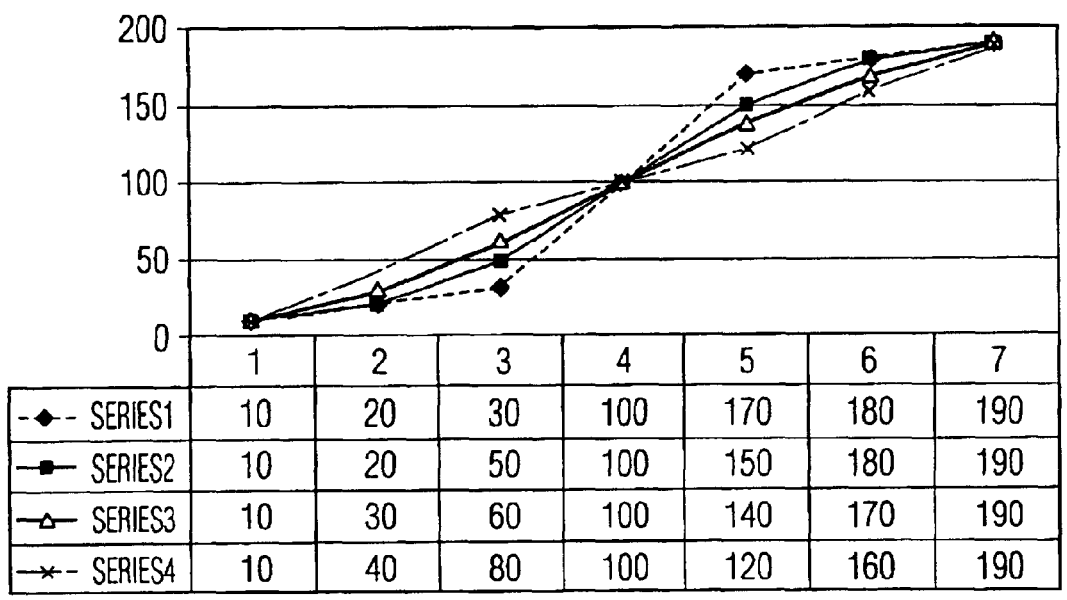
FIG. 4 depicts an example of calculating a gradient in accordance with the present invention.

FIG. 4 depicts four edge mappings, series 1–4, calculated using four candidate vectors. Each edge mapping or "edge" represents the application of each vector to a block of video data after the block has been enhanced by one of the enhancement functions. Each edge has an edge center having a luminance value of 100 at pixel or data point 4. Note that in the example shown in FIG. 4, each edge has the same height and same width, but the gradients are different. One exemplary method for accurately capturing the gradient information in the cost function is to subtract the absolute difference of three pixel pairs around the edge center from the cost function. Using this formula, the cost function for each of the four candidate vectors is as follows:

Cost_function[1]-=abs(170-30)+abs(180-20)+abs(190-10)=-480

Cost_function[2]-=abs(150-50)+abs(180-20)+abs(190-10)=-440

Cost_function[3]-=abs(140-60)+abs(170-30)+abs(190-10)=-400

Cost_function[4]-=abs(120-80)+abs(160-40)+abs(190-10)=-340

Thus, the candidate vector 1, which has the steepest edge, has the least cost.

B. Dynamic Range Control:

As mentioned before, improving the gradient of edges is one way to improve sharpness in a picture. Another way of increasing sharpness is by adding some amount of overshoots and undershoots around the edges (i.e., the Mach-Band Effect). Note that while both these methods increase sharpness, it is not always the case that the resulting picture is improved, especially when overshoots and undershoots are added. Specifically, a limit must be placed on how much the gradient can increase, as the gradient should not increase more than the height of the edge. However, in case of adding overshoots and undershoots, there is no limit. The only limits are the luminance range limits (0–255 for 8 bit luminance values) beyond which the pixel value is clipped. Hence, whenever sharpness increase is done using a 'peaking' type method, a limit needs to be set for the amount of undershoot and overshoot.

To incorporate this analysis into the cost function, the following technique is used to set the limits. First, the dynamic range of a block from the original picture is calculated. Any method may be used to calculate the dynamic range of a block. For instance, the average of five pixels that have the highest luminance values in the block may be used to provide a maximum value. Similarly, an average of five pixels that have the lowest luminance values in a block may be used to provide a minimum value. Then, the dynamic range is equal to the maximum–minimum.

Note that if the dynamic range of the block is not very large, any sharpness increase should be avoided since it might be a noisy area. Similarly, if the dynamic range of the block is very large, then any sharpness increase should also be avoided since the block is already sharp and any further increase will only cause clipping. Thus, it is only in the remaining areas that overshoots and undershoots should be added. Based on the dynamic range and the values of the highest and lowest pixels in the block, the allowed overshoots and undershoots can be calculated in a manner described below.

Note that the amount of overshoots and undershoots depends on the values of the highest and lowest pixels in the block. Thus, if the highest luminance values of the pixels in the block are very close to 255 (8 bits luminance value range), then overshoots should not be allowed even if the dynamic range is not large. Similarly, if the lowest values of the pixels in a block are very close to 0, undershoots should not be allowed since the values will be clipped to 0.

Figure 5:
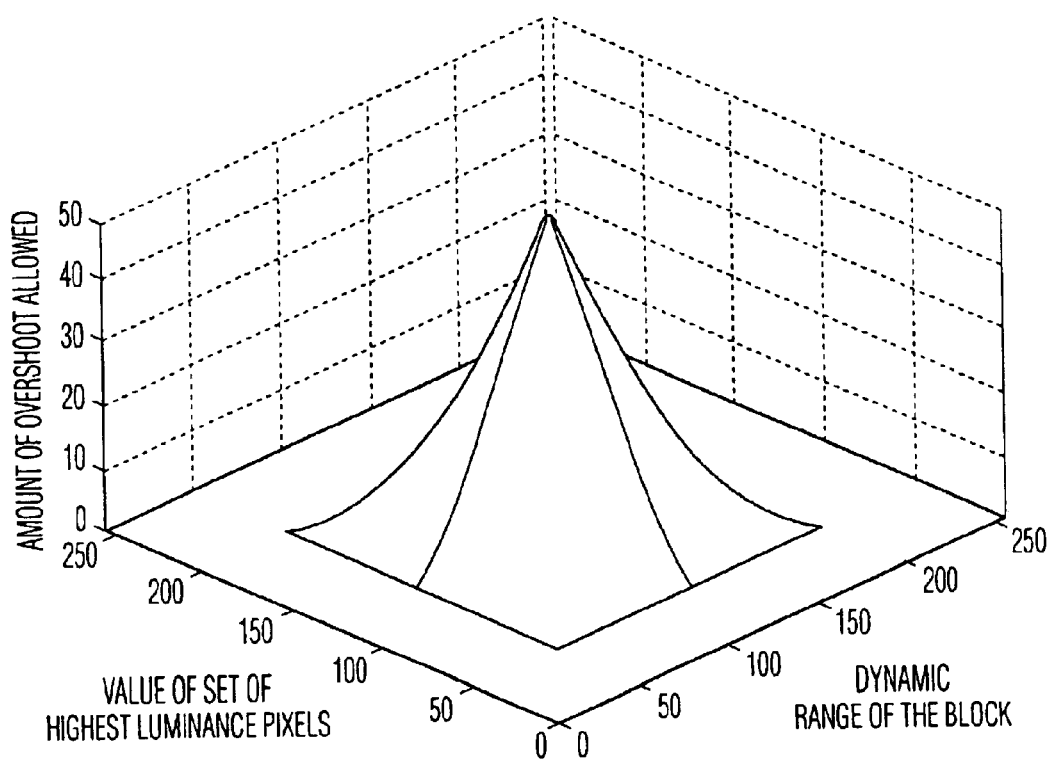
FIG. 5 depicts a graph utilized for analyzing a dynamic range in accordance with the present invention.

FIG. 5 illustrates the above idea where it is shown how the amount of overshoot is controlled based on the dynamic range of the block and based on the value of the highest luminance pixels in that block. As shown in FIG. 5, the dynamic range for the block is between 0–255. Depending on the value of the set of highest luminance pixels and the dynamic range, an amount of overshoot can be determined.

Consider the following example. Assume that the maximum pixel value is 150, and the minimum is 50, then the dynamic range is 100. Then by plugging in the dynamic range value of 100 (z axis) and the maximum value of 150 (x axis) into graph of FIG. 5, the amount of overshoot (y axis) can be determined. In this example, the amount of allowed overshoot would be approximately 20. Then, the amount of maximum allowed value, or "maximum control value" for the block would be the maximum pixel value (150) plus the amount of allowed overshoot (20), or 170. Similar calculations to determine a "minimum control value" could be done for undershoot. The maximum and minimum control values define a "controlled dynamic range."

Once the controlled dynamic range is determined, pixel information (calculated after the block was enhanced by any enhancement functions) may be incorporated into the cost function 32 as follows. If an enhanced pixel is within the controlled dynamic range, then the value of the pixel is subtracted from the cost function. If the enhanced pixel is not within the controlled dynamic range, then the value (or excess value) of the pixel is added to the cost function.

Thus, once the controlled dynamic range values are determined the picture quality analyzer 30 can move pixel by pixel in the block and test to see where the pixel exceeds the controlled dynamic range. If the pixel value exceeds the given range, the exceeding amount is added to the cost function 32 and if it is within the range, the value is subtracted. This is done for all the candidate vectors. In this way, the picture quality analyzer can find which vector is doing over-sharpening for the block and which vector is not.

4. Cost Function Implementation

Using the above two methods, a cost for each candidate vector is calculated and the one that yields the lowest cost is selected as the best enhancement vector. An exemplary pseudo-code for the cost function 32 having four candidate vectors is as follows:

```
For (each block of the picture)
{
    Calculate controlled_dynamic_range of block
    For (I=0;I<4;I++) // cost_function for 4 candidates
    {
        cost_function[I]=0;
        For (whole_block on per pixel basis)
        {
            If (pixel == edge_center)
            cost_function[I]-= edge_gradient[I];
            If (pixel[I] is within controlled_dynamic_range)
            cost_function[I]-= pixel[I]
            else
            cost_function[I] + = pixel[I];
        }
    }
    Select candidate vector that yields the lowest cost
}
```

It is understood that the systems, functions, mechanisms, circuits, methods, and modules described herein can be implemented in hardware, software, or a combination of hardware and software. They may be implemented by any type of computer system or other apparatus adapted for carrying out the methods described herein. A typical combination of hardware and software could be a general-purpose computer system with a computer program that, when loaded and executed, controls the computer system such that it carries out the methods described herein. Alternatively, a specific use computer, containing specialized hardware for carrying out one or more of the functional tasks of the invention could be utilized. The present invention can also be embedded in a computer program product, which comprises all the features enabling the implementation of the methods and functions described herein, and which—when loaded in a computer system—is able to carry out these methods and functions. Computer program, software program, program, program product, or software, in the present context mean any expression, in any language, code or notation, of a set of instructions intended to cause a system having an information processing capability to perform a particular function either directly or after either or both of the following: (a) conversion to another language, code or notation; and/or (b) reproduction in a different material form.

The foregoing description of the preferred embodiments of the invention has been presented for purposes of illustration and description. They are not intended to be exhaustive or to limit the invention to the precise form disclosed, and obviously many modifications and variations are possible in light of the above teachings. Such modifications and variations that are apparent to a person skilled in the art are intended to be included within the scope of this invention as defined by the accompanying claims.

What is claimed is:

1. A sharpness enhancement system that receives an input picture and outputs an enhanced picture, the sharpness enhancement system comprising:
   a plurality of enhancement functions that enhance the input picture; and
   a picture quality analyzer that selects an enhancement vector for the plurality of enhancement functions, wherein the enhancement vector comprises an optimal enhancement vector that is selected from a set of vectors based on a cost function that comprises: (1) a gradient analysis for determining a steepest gradient value proximate an edge center, and (2) a dynamic range analysis.

2. The sharpness enhancement system of claim 1, wherein the enhancement vector is selected for each block in the input picture.

3. The sharpness enhancement system of claim 1, wherein the dynamic range analysis includes:
   a mechanism for calculating a controlled dynamic range of a block from the input picture; and
   a mechanism for evaluating each pixel in the block relative to the controlled dynamic range after the block was enhanced by at least one enhancement function.

4. The sharpness enhancement system of claim 3, wherein the controlled dynamic range is calculated based on:
   maximum and minimum pixel values in the block; and
   an allowed amount of overshoot and undershoot associated with the block.

5. The sharpness enhancement system of claim 3, wherein the mechanism for evaluating each pixel increases the cost function for each pixel that exceeds the controlled dynamic range.

6. The sharpness enhancement system of claim 3, wherein the mechanism for evaluating each pixel decreases the cost function for each pixel that is within the controlled dynamic range.

7. The sharpness enhancement system of claim 1, wherein the gradient analysis includes:
   a mechanism for calculating the edge center of a block from the input picture; and
   a mechanism for calculating the gradient value proximate the edge center after the block is enhanced by at least one enhancement function.

8. A sharpness enhancement system that receives an input picture and outputs an enhanced picture, the sharpness enhancement system comprising:
   a plurality of enhancement functions that enhance the input picture; and
   a picture quality analyzer that selects an enhancement vector for the plurality of enhancement functions, wherein the enhancement vector is selected from a set of vectors based on a cost function that comprises: (1) a gradient analysis, and (2) dynamic range analysis,
   wherein the gradient analysis includes:
   a mechanism for calculating an edge center of a block from the input picture; and
   a mechanism for calculating a gradient value proximate the edge center after the block was enhanced by at least one enhancement function, and wherein the gradient value equals the sum of the absolute difference of three pixel pairs proximate the edge center.

9. The sharpness enhancement system of claim 8, wherein the gradient value is subtracted from the cost function.

10. The sharpness enhancement system of claim 1, wherein the picture quality analyzer calculates the cost function for each vector in the set of vectors.

11. The sharpness enhancement system of claim 10, wherein the picture quality analyzer selects the enhancement vector as the vector having the lowest calculated cost.

12. A program product stored on a recordable medium that receives an input picture and outputs an enhanced picture, the program product comprising:
   a plurality of enhancement functions that enhance the input picture; and
   means for selecting an enhancement vector for the plurality of enhancement functions, wherein the enhancement vector comprises an optimal enhancement vector that is selected from a set of vectors based on a cost function that computes: (1) a gradient analysis for determining a steepest gradient value proximate an edge center, and (2) a dynamic range analysis.

13. The program product of claim 12, wherein the enhancement vector is selected for each block in the input picture.

14. The program product of claim 12, wherein the dynamic range analysis includes:
   means for calculating a controlled dynamic range of a block from the input picture; and
   means for evaluating each pixel in the block relative to the controlled dynamic range after the block was enhanced by at least one enhancement function.

15. The program product of claim 14, wherein the controlled dynamic range is calculated based on:
   maximum and minimum pixel values in the block; and
   an allowed amount of overshoot and undershoot associated with the block.

16. The program product of claim 14, wherein the means for evaluating each pixel increases the cost function for each pixel that exceeds the controlled dynamic range.

17. The program product of claim 14, wherein the means for evaluating each pixel decreases the cost function for each pixel that is within the controlled dynamic range.

18. The program product of claim 12, wherein the gradient analysis includes:
   means for calculating the edge center of a block from the input picture; and
   means for calculating the gradient value proximate the edge center after the block is enhanced by at least one enhancement function.

19. A program product stored on a recordable medium that receives an input picture and outputs an enhanced picture, the program product comprising:
   a plurality of enhancement functions that enhance the input picture; and means for selecting an enhancement vector for the plurality of enhancement functions, wherein the enhancement vector is selected from a set of vectors based on a cost function that computes: (1) a gradient analysis, and (2) a dynamic range analysis, wherein the gradient analysis includes:

means for calculating an edge center of a block from the input picture; and means for calculating a gradient value proximate the edge center after the block was enhanced by at least one enhancement function, and wherein the gradient value equals the sum of the absolute difference of three pixel pairs proximate the edge center.

20. The program product of claim 19, wherein the gradient value is subtracted from the cost function.

21. The program product of claim 12, wherein the cost function is calculated for each vector in the set of vectors.

22. The program product of claim 21, wherein the means for selecting the enhancement vector selects the vector having the lowest calculated cost.

23. A method of enhancing sharpness of an input picture to generate an enhanced picture, the method comprising:

providing a plurality of enhancement functions that enhance the input picture;

selecting an enhancement vector for the plurality of enhancement functions, wherein the enhancement vector comprises an optimal enhancement vector that is selected from a set of vectors based on a calculated cost function, wherein the cost function is calculated using: (1) a gradient analysis for determining a steepest gradient value proximate an edge center and (2) a dynamic range analysis.

24. The method of claim 23, including the further step of selecting enhancement vectors for each block in the input picture.

25. The method of claim 23, wherein the dynamic range analysis includes:

calculating a controlled dynamic range of a block from the input picture;

enhancing the block with at least one enhancement function; and evaluating each pixel in the block relative to the controlled dynamic range.

26. The method of claim 25, wherein the controlled dynamic range is calculated using the steps of:

determining maximum and minimum pixel values in the block; and determining an allowed amount of overshoot and undershoot associated with the block.

27. The method of claim 25, wherein the step of evaluating each pixel increases the cost function for each pixel that exceeds the controlled dynamic range.

28. The method of claim 25, wherein the step of evaluating each pixel decreases the cost function for each pixel that is within the controlled dynamic range.

29. The method of claim 23, wherein the gradient analysis includes the steps of:

calculating the edge center of a block from the input picture; and calculating the gradient value proximate the edge center after the block is enhanced by at least one enhancement function.

30. A method of enhancing sharpness of an input picture to generate an enhanced picture, the method comprising:

providing a plurality of enhancement functions that enhance the input picture;

selecting an enhancement vector for the plurality of enhancement functions, wherein the enhancement vector is selected from a set of vectors based on a calculated cost function, wherein the cost function is calculated using: (1) a gradient analysis, and (2) a dynamic range analysis, wherein the gradient analysis includes the steps of:

calculating an edge center of a block from the input picture; and calculating a gradient value proximate the edge center after the block was enhanced by at least one enhancement function, and wherein the gradient value equals the sum of the absolute difference of three pixel pairs proximate the edge center.

31. The method of claim 30, wherein the gradient value is subtracted from the cost function.

32. The method of claim 23, wherein the cost function is calculated for each vector in the set of vectors.

33. The method of claim 32, wherein the step of selecting an enhancement vector selects the vector having the lowest calculated cost.

* * * * *